Dec. 5, 1933.  R. E. ADAMS  1,937,862

ELECTRIC BRAKING MECHANISM

Filed Aug. 3, 1931  4 Sheets-Sheet 1

INVENTOR
Royal E. Adams.
BY
ATTORNEYS

Dec. 5, 1933.  R. E. ADAMS  1,937,862
ELECTRIC BRAKING MECHANISM
Filed Aug. 3, 1931   4 Sheets-Sheet 2

INVENTOR
Royal E. Adams.
BY
ATTORNEYS

Dec. 5, 1933.  R. E. ADAMS  1,937,862
ELECTRIC BRAKING MECHANISM
Filed Aug. 3, 1931  4 Sheets-Sheet 4

Fig. 4.

INVENTOR
Royal E. Adams.
BY
ATTORNEYS

Patented Dec. 5, 1933

1,937,862

UNITED STATES PATENT OFFICE 1,937,862

ELECTRIC BRAKING MECHANISM

Royal E. Adams, Los Angeles, Calif.

Application August 3, 1931. Serial No. 554,838

31 Claims. (Cl. 188—162)

This invention relates to and has for a purpose the provision of a mechanism by which force can be applied to and relieved from an element to any extent as determined by adjustment of the mechanism under the control of an operator.

It is another purpose of this invention to provide a mechanim of the above described character which is capable of a wide range of use, and which in one of its many adaptations, is applicable with the utmost ease and dispatch, to an automobile or other vehicle, to function as an electrically operated, manually controlled means for applying and releasing the brakes of the vehicle either instantly or gradually as desired, and all while providing the desirable advantage of structural compactness and requiring but a negligible amount of current for its operation.

It is a further purpose of this invention to provide an electric braking mechanism structurally characterized by its capability of maintaining the brakes set any desired amount without the expenditure of electric current; its capability of providing a positive control in setting the brakes to enable the vehicle to safely remain at rest on, or drift down grades with heavy loads; its capability of exerting sufficient force to enable brakes of the metal to metal type to be employed on the vehicle; and its capability of being manually controlled without effort on the part of the operator.

It is another purpose of this invention to provide an electric braking mechanism embodying a friction clutch and circuit controller associated with the mechanism in such manner that in accordance with adjustment of the clutch to resist a predetermined load without slippage, a predetermined force will be exerted and maintained automatically by the mechanism.

One form of this invention will now be described and its novel features pointed out in claims.

Referring specifically to the drawings in which similar reference characters designate similar parts in each of the several views, my invention in its present embodiment comprises, in the present instance, a mechanism which for the purpose of illustration is shown applied to an automobile in a manner to control the braking system thereof. This mechanism comprises an electric motor M preferably of the non-reversible type, the housing 10 of which includes a head 11 to which is fixed a bracket 12 rigidly secured to one longitudinal member 13 of the automobile chassis frame to support the motor and the remainder of the mechanism embodying my invention, with the motor shaft 14 disposed horizontally and extending longitudinally of the vehicle.

To the motor shaft 14 is fixed the sun gear 15 of a planetary gear system, the sun gear meshing with planetary gears 16 mounted on stub shafts 17 carried by a spider 18 fixed on the forward end of a feed member in the form of a worm shaft 19, journaled at its forward end co-axially with the motor shaft 14, in an anti-friction bearing 20 supported by a cover 21 closing the open side of the head 11. The planetary gear system also includes an internal ring gear 22 formed in the head 11 concentric with the axis of the shaft 14 and with which mesh the planetary gears 16, to the end that when the motor is in operation, the gears of the planetary system will co-act in rotating the worm shaft at a relatively low speed and thus compound the torque of the motor exerted upon the worm shaft.

The rear end of the worm shaft 19 is journaled in an anti-friction bearing 23 supported in a head 24 rigidly connected in definite spaced relation to the head 11 by tie members in the form of square rods 25 the ends of which are reduced and threaded and pass through openings in the heads for co-action with nuts 26 in rigidly securing the tie members to the heads as will be understood.

The tie members function as guides for a member operatively connected to the brake rigging of the vehicle's braking system, and this member is in the form of a carriage C having grooves 27 in its opposite side edges receiving the rods, and a longitudinal bore 28 freely receiving the worm shaft 19, to the end that the carriage will be slidably mounted on the tie members for movement parallel with the axis of the worm shaft.

In order to operatively connect the carriage to the brake rigging, rods 29 fixed to the carriage, extend through openings in the head 24 and are rigidly connected to a cross bar 30. The usual rock shaft 31 connected to the several brakes of the vehicle (not shown) by brake rods 32, is operatively connected by an arm 33 and a pin and slot connection 34 to the cross bar 30, so that sliding movement of the carriage forward or to the left as viewed in Figure 4 will cause an application of the brakes. The usual brake releasing springs of the brake rigging (not shown) normally urge the carriage rearwardly or to the right as viewed in Figure 4.

Figure 3:
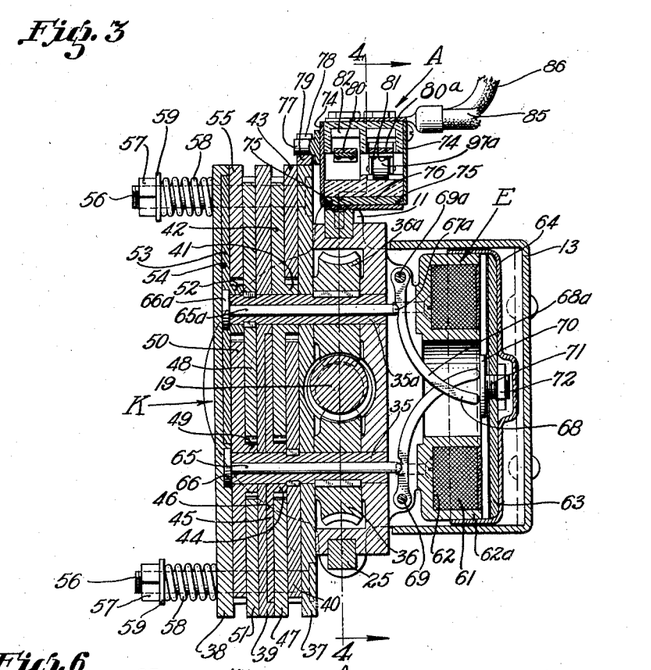
Figure 3 is a transverse sectional view taken on the line 3—3 of Figure 2 and looking in the direction of the arrows.
Figure 4:
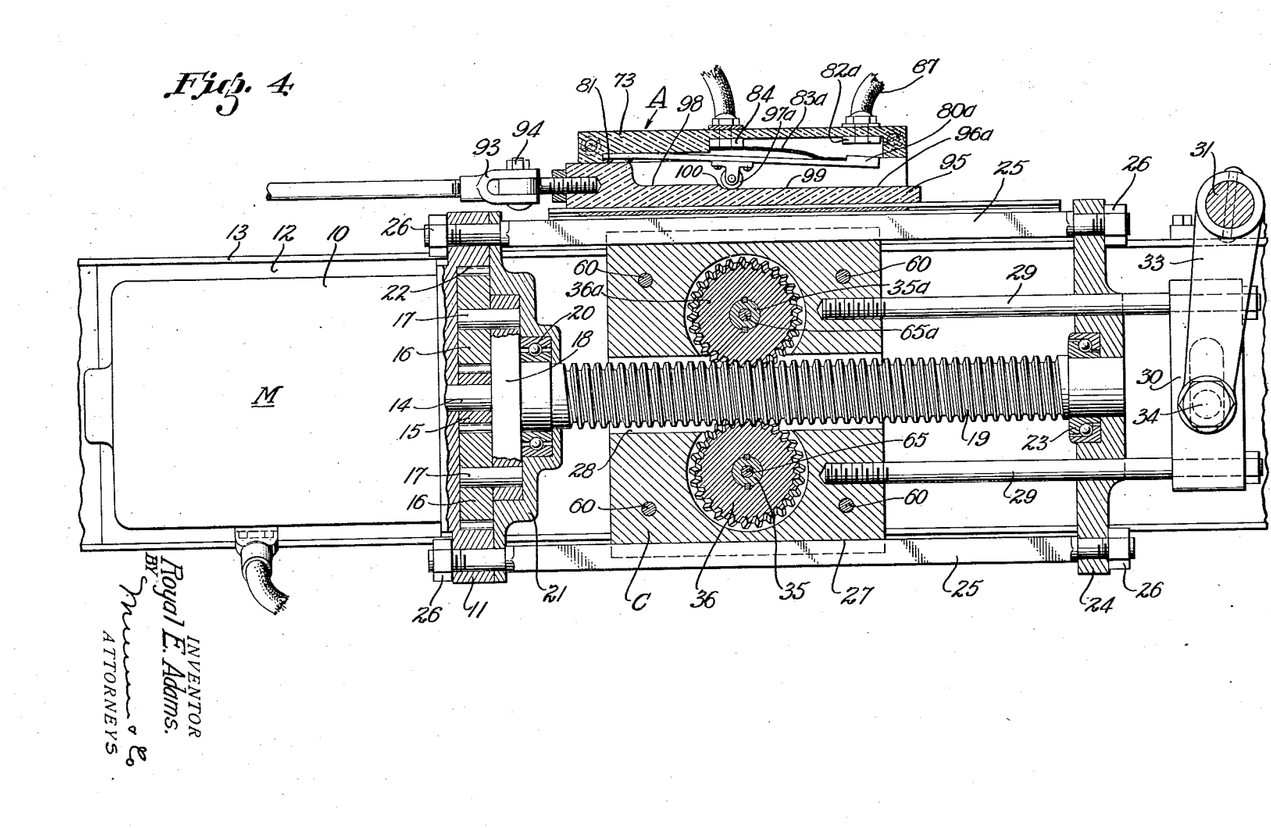
Figure 4 is a vertical longitudinal sectional view taken on the line 4—4 of Figure 3 and looking in the direction of the arrows.
Figure 5:
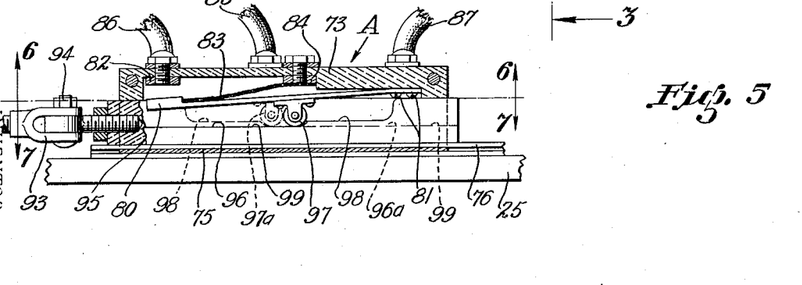
Figure 5 is an enlarged fragmentary sectional view taken on the line 5—5 of Figure 1 and illustrating a circuit controller embodied in this invention.

Journaled in the carriage at opposite sides of the worm shaft 19 are tubular shafts 35 and 35a to which are respectively keyed, worm wheels 36 and 36a constantly meshing with the worm shaft at opposite sides thereof as clearly shown in Figures 3 and 4. For controlling the worm wheels in a manner to enable the latter to be held against rotation and thereby co-act in functioning as a nut operable in response to rotation of the worm shaft in one direction, to feed the carriage forwardly or to the left as viewed in Figure 4, and thus effect a brake application, a clutch K which in the present instance is of the friction dry-disk type, is provided.

This clutch comprises a stationary inner plate 37 abutting one side face of the carriage and through which the tubular shafts 35 and 35a extend; a movable outer plate 38; and an intermediate plate 39. Between the inner and intermediate plates is interposed a relatively large gear 40 splined on the tubular shaft 35 and meshing with a relatively small gear 41 formed integral with or rigidly secured to a second relatively large gear 42 freely rotatable on the tubular shaft 35a.

A filler plate 43 is interposed between the gear 42 and inner plate 37; and meshing with the gear 42 is a relatively small gear 44 formed integral with a friction disk 45 rotatably mounted on the shaft 35 and seating in a pocket 46 in the intermediate plate 39 so as to be partly interposed between the latter and the gear 42, and partly interposed between the intermediate plate and a second filler plate 47.

Interposed between the intermediate plate 39 and the outer plate 38 is a relatively large gear 48 splined on the shaft 35a and meshing with a relatively small gear 49 formed integral with or rigidly secured to a second relatively large gear 50 rotatably mounted on the shaft 35 and abutting the outer plate 38 and a filler plate 51. The gear 50 meshes with a relatively small gear 52 formed integral with a friction disk 53 rotatably mounted on the shaft 35a and seating in a pocket 54 formed in the outer plate 38 to abut the gear 50 and a filler plate 55.

Headed studs 56 four in number in the present instance, extend freely through registering openings formed in the outer, intermediate, inner and filler plates adjacent the corners thereof, and these studs are threaded at their outer ends to receive nuts 57. Coil springs 58 are mounted on the studs and are interposed between the outer plate 38 and washers 59 abutting the nuts 57. The springs function to urge the outer plate 38 towards the inner plate 37 which latter is rigidly secured to the carriage by bolts 60 indicated in Figure 4.

When the worm shaft 19 is being rotated, its movement tends to rotate the worm wheels 36 and 36a and hence the shafts 35 and 35a in opposed directions, resulting in the tendency to rotate the gear 40, friction disk 45 and gear 50 in directions opposed to those of the gear 42, gear 48, and friction disk 53 respectively. This tendency is resisted by the tremendous friction set up between the confronting surfaces of the plates, gears and friction disks under the action of the springs 58, so that until a sufficient load is imposed on the carriage to overcome the friction and cause slippage, the worm wheels will be held against rotation by the clutch and will thus co-act in functioning as a nut operable to feed the carriage forward or to the left as viewed in Figure 1, thus effecting a brake application increasing in force as the carriage is fed.

In conjunction with the clutch K, a means is provided for releasing the clutch to render it ineffective to hold the worm wheels 36 and 36a against rotation, and this means in the present instance comprises an electro responsive device designated generally at E enclosed by a suitable casing supported from the carriage K. The electro responsive device comprises an electromagnet the winding 61 of which is annular in form seated in the annular pocket 62 of a ring 62a rigidly secured to that side of the carriage opposite the clutch, and disposed with the axis of the ring in intersecting relation to the axis of the worm shaft. Coacting with the winding is a disk armature 63 confined to movement axially of the winding by a cup shaped retainer 64 fitted over the ring.

Extending through the tubular shafts 35 and 35a are pins 65 and 65a having heads 66 and 66a respectively, bearing against the outer plate 38 of the clutch K. The opposite ends of these pins respectively seat in notches 67 and 67a formed respectively in curved arms 68 and 68a pivoted respectively at 69 and 69a on the carriage. The free extremities of the arms bear against the head 70 or a screw 71 threaded axially through the armature 63 and provided with a lock nut 72 to secure the stop in a selected position of adjustment.

Under the action of the springs 58 in normally maintaining the clutch engaged, the pins and arms hold the armature spaced from the winding 61 as shown in Figure 3, so that when the winding is energized, the armature will respond by actuating the arms 68 and 68a, which in turn push against the pins 66 and 66a to cause the latter to force the plate 38 outwardly against the action of the springs 68 and thereby release the clutch.

As the clutch when thus released, renders the worm wheels free to rotate and hence roll upon the worm shaft, the carriage is enabled to move rearward or towards the right as viewed in Figure 4, under the action of the usual brake releasing springs, thus releasing the brakes.

In the present instance a circuit controller A is employed in co-action with suitable circuits and a source of current supply such as a battery B, to control the supply of current to the motor M and electro-responsive device E in such manner as to enable the brakes to be instantly or gradually applied or released to any extent desired, all under the direct control of the operator of the vehicle.

Figure 2:
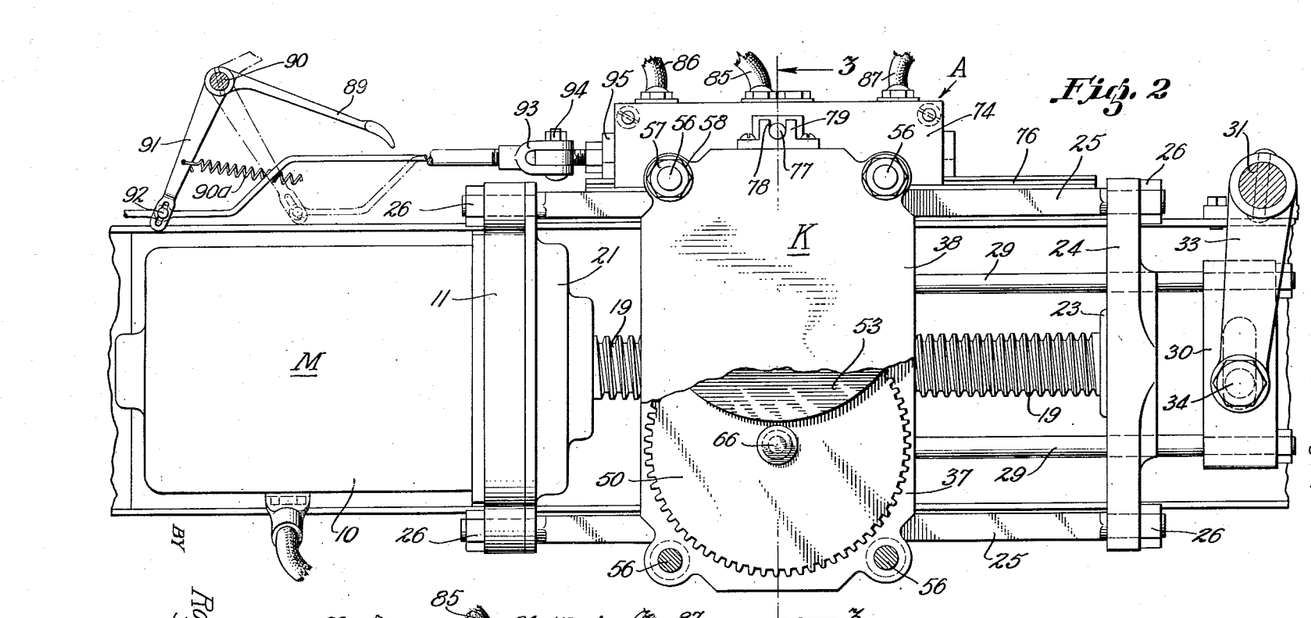
Figure 2 is an enlarged view of the electric braking mechanism in side elevation partly broken away.

This circuit controller comprises a rectangular body 73 of insulating material having metal plates 74 fixed thereto on opposite vertical sides as shown in Figure 3. The bottom edges of these plates are provided with flanges 75 slidably received in suitable grooves formed in a guide plate 76 fixed to one of the tie members 25. The body 73 is operatively connected to the carriage C for sliding movement therewith as the carriage travels upon the members 25 forward or rearward, by a pin 77 projecting from the body into the slot 78 of a yoke 79 fixed to the inner plate 38 of the clutch K as shown in Figures 2 and 3.

Figures 6, 7:
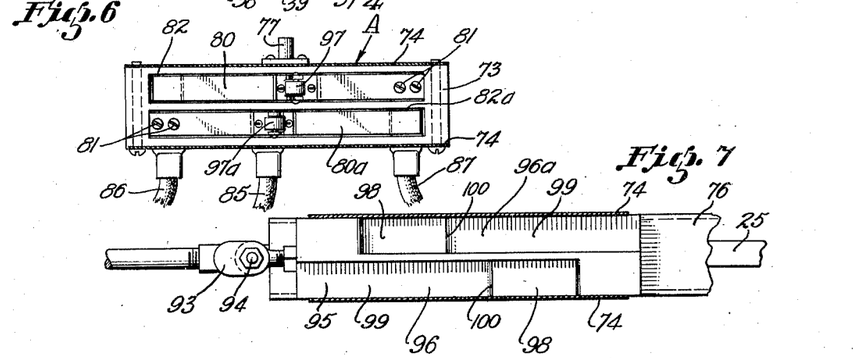
Figures 6 and 7 are horizontal sectional views taken respectively on the lines 6—6 and 7—7 and looking in the direction of the respective arrows.
Figure 8:
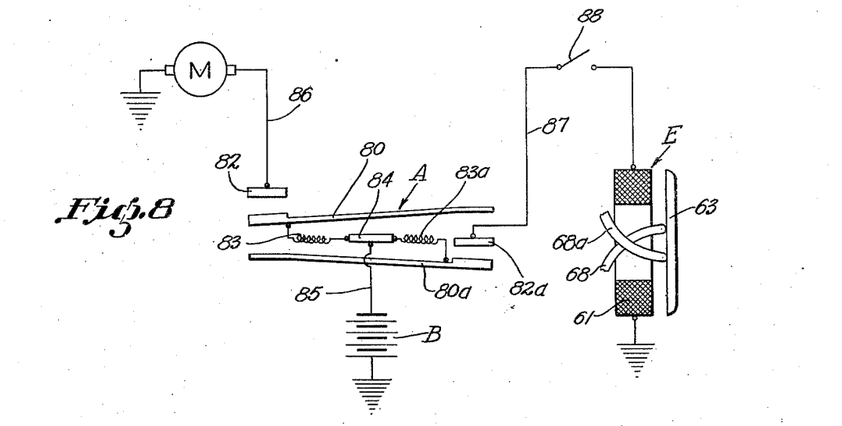
Figure 8 is a diagrammatic view of the electrical circuits embodied in this invention.

Mounted in pockets formed in the body 73 are flexible contact arms 80 and 80a extending longitudinally in the body and secured at respectively opposite ends to the body by screws 81 as shown in Figure 6. The contact arms are normally urged to dispose their free extremities out of engagement with stationary contacts 82 and 82a respectively, fixed to the body. As shown diagrammatically in Figure 8, the contact arms are respectively connected by flexible conductors 83 and 83a to a terminal 84 on the body 73, from which leads a conductor 85 to one side of the battery B, the other side of which is grounded. The stationary contact 82 is connected by a conductor 86 to the motor M which is grounded as shown; whereas the stationary contact 82a is connected by a conductor 87 to the winding 61 of the electro-magnet, also grounded as shown. The conductor 87 also includes a switch 88 disposed in a position accessible to the operator for manual operation to discontinue the supply of current to the electro-magnet for a purpose to be later described.

The circuit controller includes a manually operable actuating means for moving one contact arm or the other into engagement with the respective stationary contact to selectively supply current to the motor or electro-responsive device according as it is desired to apply or release the brakes. This actuating means comprises in the present instance, a pedal 89 fixed to a rock shaft 90 at a location convenient to a foot of the operator, and is normally urged by a spring 90a to the elevated position shown in broken lines in Figure 2.

Also fixed to the rock shaft 90 is an arm 91 having a pin and slot connection 92 with a link 93 pivotally connected at 94 to a block 95 of insulating material slidably mounted in the body 73, to the end that according as the pedal 89 is depressed or elevated, the block will be moved longitudinally of the body in one direction or the other.

The upper surface of the block is formed to provide two cam surfaces 96 and 96a on which ride rollers 97 and 97a respectively, journaled on the contact arms 80 and 80a as shown in Figures 6 and 7. It will be noted from a consideration of Figures 4 to 7 inclusive that these cam surfaces are identical in construction and oppositely disposed in side by side relation. Each cam surface is in the form of a flat track offset intermediate its ends to provide upper and lower levels 98 and 99 connected by a substantially abrupt shoulder 100, from which it will be understood that when the rollers 97 and 97a ride upon the lower levels, the contact members are out of engagement with the stationary contacts, whereas when the block 95 is moved in one direction or the other sufficiently to accordingly cause one roller or the other to ride upon the upper level of the respective track, one contact member or the other will be moved into engagement with the respective stationary contact.

The operation of the mechanism is as follows:

With the switch 88 closed; the carriage C occupying its furthest extreme position rearward or to the right as viewed in Figure 4, under the urging action of the brake releasing springs; and the pedal 89 occupying its elevated position shown in broken lines in Figure 2, under the action of the spring 90a, the rollers 97 and 97a will rest upon the lower levels 99 of the cam surfaces 96 and 96a respectively, in close proximity to the shoulders 100, so that the contact arms 80 and 80a will be out of engagement with the respective stationary contacts 82 and 82a, thus preventing the supply of current from the battery B to the motor M and electro-responsive device E.

Upon depressing the pedal 89, the block 95 will be moved forward or to the left as viewed in Figure 6 to cause the shoulder 100 of the cam surface 96 to strike the roller 97 and suddenly raise the roller onto the upper level 98 of the cam surface, thus suddenly moving the contact arm 80 into engagement with the stationary contact 82 to supply current to the motor M by completing a circuit as follows: From battery B, terminal 84, conductor 83, contact arm 80, contact 82, conductor 86, motor M and back to battery.

As the clutch K is engaged, the worm wheels 36 and 36a will be held against rotation, so that as the worm shaft 19 is rotated by the motor through the planetary gearing, the worm wheels will co-act in functioning as a nut to feed the carriage C forward or to the left as viewed in Figure 4 thus exerting a force to apply the brakes. So long as depressing movement of the pedal 89 is continued, the motor circuit will remain complete, thereby continuing forward feeding of the carriage to increase the braking application.

However, when depressing movement of the pedal is discontinued, the body 73 in moving the contact members 80 and 80a therewith in accordance with the forward feed of the carriage, will cause the roller 97 to instantly ride from the upper level 98 to the lower level 99 of the cam surface 96 on the block 95 which is now stationary due to the pedal being at rest, thereby instantly disrupting the motor circuit and causing the forward feed of the carriage to cease.

As the carriage is locked by the clutch and worm wheels co-acting with the worm shaft, the brakes will be maintained applied with a force determined by the extent of forward feeding of the carriage as is dependent on the extent to which the pedal has been depressed. It will thus be clear that the intensity of the brake application will be in accordance with the depressing movement of the pedal as the motor circuit is completed whenever the pedal is depressed to any extent, and is automatically disrupted when depressing movement of the pedal ceases. During all the movements above described, it will be understood that the roller 97a rides upon the lower level 99 of the cam surface 96a so that the contact arm 80a will be out of engagement with the contact 82a, thus preventing the supply of current to the electro-responsive device E.

Immediately upon releasing foot pressure from the pedal 89 the spring 90a will act to move the pedal towards its extreme elevated position, thus moving the block 95 rearwardly or to the right as viewed in Figure 3, with the result that the shoulder 100 of the cam surface 96a will strike the roller 97a to cause the latter to suddenly ride onto the upper level 98 of this cam surface, thus forcing the contact arm 80a into engagement with the stationary contact 82a and completing a circuit including the electro-responsive device E as follows. From battery B, conductor 85, terminal 84, conductor 83a, contact arm 80a, contact 82a, conductor 87, switch 88, winding 61 back to battery.

Energization of the winding 61 causes the armature to co-act with the arms 68—68a and the pins 65—65a, to move the outer plate 38 of the clutch K against the action of the springs 58 as previously described, thus releasing the clutch. As the worm wheels 36 and 36a are now free to rotate, and the carriage C is urged rearward or to the right as viewed in Figure 3, the worm wheels will roll upon the now stationary worm shaft which merely functions as a rack, thus reducing the brake application.

Should it not be desired to release the brakes completely, the pedal 89 is held against elevating movement in any depressed position with the result that when elevating movement of the pedal ceases, the body 73 and the contact arms 80 and 80a in moving rearwardly with the carriage, will instantly cause the roller 98a to drop from the upper level 98a to the lower level 99a of the cam surface 96a, whereby the circuit including the electro-responsive device will be disrupted, so that the clutch will again engage under the action of the springs 58.

As the worm wheels are thereby prevented from rotating, they co-act with the worm shaft and the clutch, to lock the carriage against movement, thus preventing further release of the brakes.

From the foregoing description it will be manifest that according as the pedal 89 is depressed or elevated, the brakes will be applied or released instantly or gradually depending on the rate of movement of the pedal, and to an extent governed by the position of the pedal with respect to its extreme elevated and depressed positions.

Should it be desired to maintain the brakes applied when the vehicle is parked or unattended, the pedal 89 is depressed sufficiently to set the brakes, and while the pedal is held depressed, the switch 88 is opened, after which the pedal is released. Although the circuit for the electro-responsive device will now be completed insofar as the contact arm 80a and contact 82a are concerned, this circuit will actually be incomplete due to the open switch 88, thus preventing the supply of current to the winding 61 and the release of the clutch K. As a result, the brakes will remain applied without any consumption of current. By the provision of this feature, the vehicle can be held stationary on grades without manual effort, and in the case of heavily laden trucks, the pedal 89 can be suitably set and the switch 88 opened to maintain a constant braking force enabling the truck to safely drift down grades.

Figure 1:
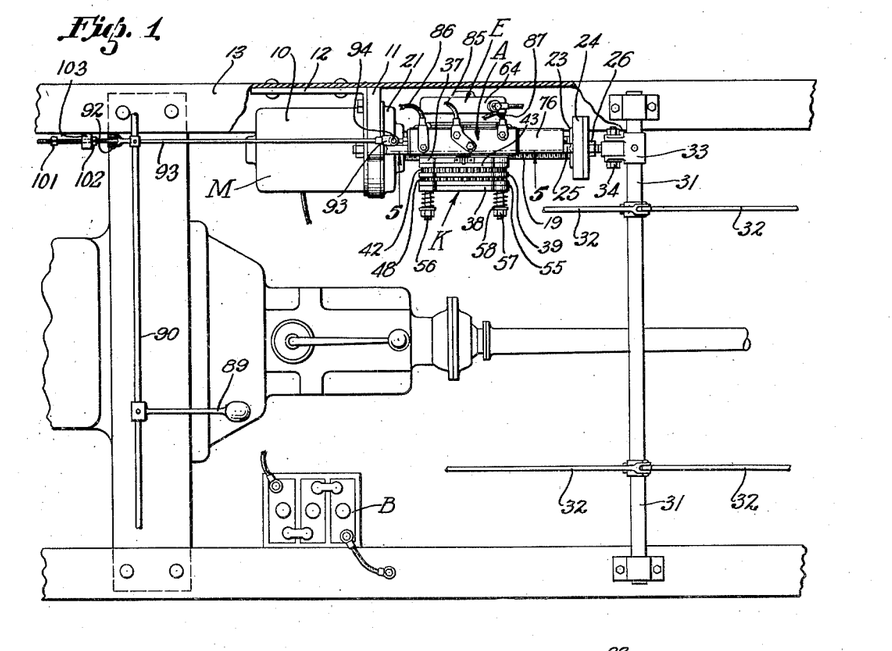
Figure 1 is a view showing in plan, one form of electric braking mechanism embodying this invention as applied to an automobile.

It will be noted from a consideration of Figure 1, that the link 93 is extended forwardly beyond its pin and slot connection with the arm 91 and is externally threaded to receive nuts 101 and 102 constituting adjustable stops, one or the other of which is engageable with an abutment 103 to accordingly limit the extreme elevated or depressed position of the pedal 89 and hence determine the maximum travel of the carriage C. The forward end of the link 93 passes freely through the abutment 103 which is fixed to the longitudinal member 13 of the chassis frame so as to definitely guide the link in its movements.

It will be manifest that by suitable adjustment of the nut 101, the depressing movement of the pedal can be increased to permit further brake applying movement of the carriage and thus compensate for wearing of the brake bands, to the end of providing a means by which a convenient adjustment of the brakes can be effected.

Although I have herein shown and described only one form of electric braking mechanism embodying my invention, it is to be understood that various changes and modifications may be made therein without departing from the spirit of the invention and the spirit and scope of the appended claims.

I claim:

1. Mechanism of the character described comprising a member operatively connected to an element to which force is to be applied and normally urged to relieve the element of the force, means operatively connected to the member to move the latter in a direction applying force to said element, an electric motor for driving the first means, electro-responsive means for disrupting the operative connection between the member and first means to render the member free to relieve the force from said element, a source of current supply, circuits including the motor and electro-responsive means, and a circuit controller including a manually operable actuator and means correlated with said actuator and the first means to supply current to the motor and electro-responsive means in such manner that the amount of force applied to and relieved from said element by the first means, will be governed by the position of the actuator relative to the position of the first means.

2. Braking mechanism comprising a member operatively connected to a brake and normally urged in a direction releasing the brake, means operatively connected to the member to move the latter in a direction applying the brake, an electric motor for driving said means, electro-responsive means operable when energized, to disrupt the operative connection between the member and first means to render the member free for brake releasing movement, a source of current supply, circuits including the motor and electro-responsive means, and a circuit controller for selectively supplying current to the motor and electro-responsive means.

3. Mechanism of the character described comprising a rotatably mounted worm shaft, a carriage adapted for operative connection to an element to which force is to be applied, worm wheels journaled on the carriage and meshing with the shaft, means for restraining the worm wheels against rotation whereby to cause the worm wheels to function as a nut for co-action with the shaft in feeding the carriage in response to rotation of the shaft, means for driving the shaft, and means whereby the restraining means is rendered ineffective so that the worm wheels will be free to roll upon the shaft and thereby enable the carriage to move while the shaft remains at rest.

4. Mechanism of the character described comprising a rotatably mounted worm shaft, a carriage adapted for operative connection to an element to which force is to be applied, worm wheels journaled on the carriage and meshing with the shaft, a clutch correlated with the worm wheels to restrain the latter against rotation whereby to cause the worm wheels to function as a nut for co-action with the shaft in feeding the carriage in response to rotation of the shaft, means for driving the shaft, and means whereby the restraining means is rendered ineffective so that the worm wheels will be free to roll upon the shaft and thereby enable the carriage to move while the shaft remains at rest.

5. Mechanism of the character described comprising a rotatably mounted worm shaft, a carriage adapted for operative connection to an element to which force is to be applied, worm wheels journaled on the carriage and meshing with the shaft, a friction clutch of the disk type correlated with the worm wheels to restrain the latter against rotation whereby to cause the worm wheels to function as a nut for co-action with the shaft in feeding the carriage in response to rotation of the shaft, means for driving the shaft, and means whereby the restraining means is rendered ineffective so that the worm wheels will be free to roll upon the shaft and thereby enable the carriage to move while the shaft remains at rest.

6. Mechanism of the character described comprising a rotatably mounted worm shaft, a carriage adapted for operative connection to an element to which force is to be applied, worm wheels journaled on the carriage and meshing with the shaft, means for restraining the worm wheels against rotation whereby to cause the worm wheels to function as a nut for co-action with the shaft in feeding the carriage in response to rotation of the shaft, an electric motor for driving the shaft, electro-responsive means for rendering the restraining means ineffective so that the worm wheels will be free to roll upon the shaft and thereby enable the carriage to move while the shaft remains at rest, and means including a source of current supply, circuits for the motor and electro-responsive means, and a circuit controller manually operable to control the supply of current to the motor and electro-responsive means.

7. Mechanism of the character described comprising a rotatably mounted worm shaft, a carriage adapted for operative connection to an element to which force is to be applied, worm wheels journaled on the carriage and meshing with the shaft, means for restraining the worm wheels against rotation whereby to cause the worm wheels to function as a nut for co-action with the shaft in feeding the carriage in response to rotation of the shaft, an electric motor for driving the shaft, electro-responsive means for rendering the restraining means ineffective so that the worm wheels will be free to roll upon the shaft and thereby enable the carriage to move while the shaft remains at rest, and means including a source of current supply, circuits for the motor and electro-responsive means, and a circuit controller having a part correlated with the carriage and a part manually movable and co-acting with the first part to control operation of the motor and electro-responsive means in accordance with the movement of the manually operable part.

8. In an electric brake, a rotatably mounted feed shaft, a carriage adapted for operative connection to a brake to apply or release the latter according as the carriage is moved in one direction or another, means forming an operative connection between the feed shaft and carriage, by which rotation of the shaft will effect feeding of the carriage, an electric motor for driving the shaft to feed the carriage in a direction to apply the brake, electro-responsive means for disrupting the operative connection provided by the first means in order to render the carriage free to move in a direction to release the brake while the shaft remains at rest, and means including a source of current supply, circuits for the motor and electro-responsive means, and a circuit controller manually operable to control the supply of current to the motor and electro-responsive means.

9. In an electric brake, a rotatably mounted feed shaft, a carriage adapted for operative connection to a brake to apply or release the latter according as the carriage is moved in one direction or another, means forming an operative connection between the feed shaft and carriage, by which rotation of the shaft will effect feeding of the carriage, an electric motor for driving the shaft to feed the carriage in a direction to apply the brake, electro-responsive means for disrupting the operative connection provided by the first means in order to render the carriage free to move in a direction to release the brake while the shaft remains at rest, and means including a source of current supply, circuits for the motor and electro-responsive means, and a circuit controller having a part correlated with the carriage and a part manually movable and co-acting with the first part to control operation of the motor and electro-responsive means in accordance with the movement of the manually operable part.

10. In an electric brake, a rotatably mounted feed shaft, a carriage adapted for operative connection to a brake to apply or release the latter according as the carriage is moved in one direction or another, means forming an operative connection between the feed shaft and carriage, by which rotation of the shaft will effect feeding of the carriage, an electric motor for driving the shaft to feed the carriage in a direction to apply the brake, electro-responsive means for disrupting the operative connection provided by the first means in order to render the carriage free to move in a direction to release the brake while the shaft remains at rest, and means including a source of current supply, circuits for the motor and electro-responsive means, and a circuit controller for the motor and electro-responsive means, including a manually operable actuator and means correlated with the carriage, to supply current to the motor in accordance with the extent of one movement of the actuator and to supply current to the electro-responsive means in accordance with the extent of another movement of the actuator.

11. Braking mechanism comprising a rotary feed member, means operatively connected to a brake to apply or release the latter according as said means is moved in one direction or another, means co-acting with the feed member to move the first means in the direction applying the brake, in response to rotation of the feed member in one direction, an electric motor for driving the feed member, electro-responsive means for rendering the last means ineffective to co-act with the feed member whereby the first means will be free to move in the direction releasing the brakes, a source of current supply, circuits including the motor and electro-responsive means, and a circuit controller manually operable to selectively supply current to the motor and electro-responsive means.

12. Braking mechanism comprising a rotary feed member, means operatively connected to a brake to apply or release the latter according as said means is moved in one direction or another, means co-acting with the feed member to move the first means in the direction applying the brake, in response to rotation of the feed member in one direction, an electric motor for driving the feed member, electro-responsive means for rendering the last means ineffective to co-act with the feed member whereby the first means will be free to move in the direction releasing the brakes, a source of current supply, circuits including the motor and electro-responsive means, and a circuit controller including a manually operable actuator and means correlated with said actuator and the first means, to selectively supply current to the motor or the electro-responsive means in accordance with the extent of one movement or another of the actuator.

13. Braking mechanism comprising a rotary feed member, means operatively connected to a brake to apply or release the latter according as said means is moved in one direction or another, means co-acting with the feed member to move the first means in the direction applying the brake, in response to rotation of the feed member in one direction, an electric motor for driving the feed member, electro-responsive means for rendering the last means ineffective to co-act with the feed member whereby the first means will be free to move in the direction releasing the brakes, a source of current supply, two pairs of contacts movable with the first means and normally disengaged, circuits, one including one pair of contacts and the motor, and the other including the other pair of contacts and the electro-responsive means, and means including a manually operable actuator, correlated with the pairs of contacts to engage the contacts of one pair or the other according as the actuator is moved in one direction or another, whereby to selectively supply current to the motor and electro-responsive means and in such manner that when movement of the actuator ceases, the supply of current to either the motor or electro responsive means will be discontinued.

14. Mechanism of the character described comprising a member operatively connected to an element to which force is to be applied and normally urged to relieve the element of force, a rotary feed shaft, means on the member having threaded engagement with the shaft, means whereby the last means is caused to function as a nut operable to feed the member in a direction applying force to said element when the shaft is rotated in one direction, means for driving the shaft, means for rendering the second means ineffective so that the member will be free to relieve said element of force while the shaft remains at rest, and means for selectively supplying power to the driving means and second said means.

15. In a vehicle braking system, mechanism for applying the brakes including an electric motor for driving the mechanism, mechanism for releasing the brakes including electro-responsive actuating means therefor, a source of current supply, and a circuit controller including a manually operable actuator movable from brake releasing to brake applying positions, means for supplying current to the motor in response to brake applying movement of the actuator and for discontinuing the supply of current to the motor when brake applying movement of the actuator ceases, and means for supplying current to the electro-responsive means in response to brake releasing movement of the actuator and for discontinuing the supply of current to the electro-responsive means when brake releasing movement of the actuator ceases, whereby the extent to which the brakes are applied or released will be dependent on the movement and position of the actuator.

16. In a vehicle braking system, mechanism for applying the brakes including an electric motor for driving the mechanism, mechanism for releasing the brakes including electro-responsive actuating means therefor, a source of current supply, and a circuit controller including a manually operable actuator movable from brake releasing to brake applying positions, means for normally urging the actuator to brake releasing position, means for supplying current to the motor in response to brake applying movement of the actuator and for discontinuing the supply of current to the motor when brake applying movement of the actuator ceases, means for supplying current to the electro-responsive means in response to brake releasing movement of the actuator and for discontinuing the supply of current to the electro-responsive means when brake releasing movement of the actuator ceases, whereby the extent to which the brakes are applied or released will be dependent on the movement and position of the actuator, and manually operable means by which the supply of current to the electro-responsive means can be discontinued independently of the last means, to enable the brakes to be maintained applied by the first mechanism with the actuator released from any brake applying position.

17. In a vehicle braking system, mechanism for applying the brakes including an electric motor for driving the mechanism, mechanism for releasing the brakes including electro-responsive actuating means therefor, a source of current supply, and a circuit controller including a manually operable actuator movable from brake releasing to brake applying positions, means for supplying current to the motor in response to brake applying movement of the actuator and for discontinuing the supply of current to the motor when brake applying movement of the actuator ceases, means for supplying current to the electro-responsive means in response to brake releasing movement of the actuator and for discontinuing the supply of current to the electro-responsive means when brake releasing movement of the actuator ceases, whereby the extent to which the brakes are applied or released will be dependent on the movement and position of the actuator, and means by which the extent of movement of the actuator can be varied to accordingly vary the maximum brake application possible by the first mechanism and compensate for wear at the brakes.

18. In a mechanism of the character described, the combination of an electric motor, guide ways in parallel relation to the axis of the motor, a planetary reducing gear on the head of the said motor, a worm shaft in line with the axis of the said motor to be driven thereby, a carriage adapted to travel on the said ways, a worm gear journaled on the said carriage and meshing with the said worm, rod brake connections for said carriage parallel with the said worm, a disk clutch for the said worm gear, spring means for holding the clutch engaged, an electromagnet connected to release the said clutch, a battery or source of electric current, a switch means carried by the said carriage having connections from the battery and with independent connections to the motor and to said electromagnet, yielding switch members in normally open position to contact and deliver current to the said motor or the said electromagnet having projecting lugs thereon, a switch slide in ways in said carriage parallel to the said guide ways and having shoulders facing in opposite directions to cooperate with the said switch lugs to close the circuit on the adjustment of the switch slide in the direction of movement of the said carriage for the application of the brakes and in the opposite direction for the actuation of the switch to close the circuit to the electromagnet to throw out the clutch, and a pedal having a connection to said switch slide to manipulate the said slide and adjust the position thereof to actuate the said motor or to actuate the said elecromagnet to control the said brake and the position thereof.

19. In a mechanism of the character described, the combination of an electric motor, guide ways, a carriage adapted to travel on the said ways, a gear connection for said motor to said carriage, brake connections for said carriage, a disk clutch in said gear connections, spring means for holding the clutch engaged, an electromagnet connected to release the said clutch, a battery or source of electric current, a switch means carried by the said carriage having connections from the battery and with independent connections to the motor and to said electromagnet, yielding switch members in normally open position to contact and deliver current to the said motor or to the said electromagnet having projecting lugs thereon, a switch slide in ways in said carriage parallel to the said guide ways and having shoulders facing in opposite directions to cooperate with the said switch members to close the circuit on the adjustment of the switch slide in the direction of movement of the said carriage for the application of the brakes and in the opposite direction for the actuation of the switch to close the circuit to the elecromagnet to throw out the clutch, and a spring controlled pedal having a connection to said switch slide to manipulate the said slide and adjust the position thereof to actuate the said motor or to actuate the said electromagnet to control the said brake and the position thereof.

20. In a mechanism of the character described, the combination of an electric motor, guide ways, a carriage adapted to travel on the said ways, a gear connection for said motor to said carriage, brake connections for said carriage, a disk clutch in said gear connections, spring means for holding the clutch engaged, an electromagnet connected to release the said clutch, a battery or source of electric current, a switch means carried by the said carriage having connections from the battery and with independent connections to the motor and to said electromagnet, yielding switch members in normally open position to contact and deliver current to the said motor or to the said electromagnet having projecting lugs thereon, a switch slide in ways in said carriage parallel to the said guide ways and having shoulders facing in opposite directions to cooperate with the said switch members to close the circuit on the adjustment of the switch slide in the direction of movement of the said carriage for the application of the brakes and in the opposite direction for the actuation of the switch to close the circuit to the electromagnet to throw out the clutch, and a pedal having a connection to said switch slide to manipulate the said slide and adjust the position thereof to actuate the said motor or to actuate the said electromagnet to control the said brake and the position thereof.

21. In a mechanism of the character described, the combination of an electric motor, gear actuating means and connections from said motor to a brake rigging, a releasable clutch in said gear connections, an electromagnet connected to release the said clutch, a battery or source of electric current, a switch means carried by the said brake actuating means having connections from the battery and with independent connections to the motor and to said electromagnet, yielding switch members in normally open position to contact and deliver current to the said motor or to the said electromagnet, a switch slide having shoulders facing in opposite directions to cooperate with the said switch members to close the circuit on the adjustment of the switch slide in the direction of movement for the application of the brakes and in the opposite direction for the actuation of the switch to close the circuit to the electromagnet to throw out the clutch, and a pedal having a connection to said switch slide to manipulate the said slide and adjust the position thereof to actuate the said motor or to actuate the said electromagnet to control the said brake and the position thereof.

22. In a mechanism of the character described, the combination of an electric motor, guide ways, a carriage adapted to travel on the said ways, a gear connection for said motor to said carriage, brake connections for said carriage, a battery or source of electric current, a switch means carried by the said carriage having connections from the battery and with connections to the motor, a yielding switch member in normally open position to contact and deliver current to the said motor, a switch slide in ways in said carriage parallel to the said guide ways and having a shoulder to cooperate with the said switch member to close the circuit on the adjustment of the switch slide in the direction of movement of the said carriage for the application of the brakes, and a spring controlled pedal having a connection to said switch slide to manipulate the said slide and adjust the position thereof to actuate the said motor to control the said brake and the position thereof.

23. In a mechanism of the character described, the combination of an electric motor, guide ways, a carriage adapted to travel on the said ways, a gear connection for said motor to said carriage, brake connections for said carriage, a battery or source of electric current, a switch means carried by the said carriage having connections from the battery and with connections to the motor, a yielding switch member in normally open position to contact and deliver current to the said motor, a switch slide in ways in said carriage parallel to the said guide ways and having a shoulder to cooperate with the said switch member to close the circuit on the adjustment of the switch slide in the direction of movement of the said carriage for the application of the brakes, and a pedal having a connection to said switch slide to manipulate the said slide and adjust the position thereof to actuate the said motor to control the said brake and the position thereof.

24. In a mechanism of the character described, the combination of an electric motor, gear actuating means and connections from said motor to a brake rigging, a disk clutch in said gear connections, spring means for holding the clutch engaged, an electromagnet connected to release the said clutch, a battery or source of electric current, a switch means carried by the said brake actuating means having connections from the battery and with connections to the said electromagnet, a yielding switch member in normally open position to contact and deliver current to the said electromagnet, a switch slide having a shoulder to cooperate with the said switch member to close the circuit on the adjustment of the switch slide for the actuation of the switch to close the circuit to the electromagnet to throw out the clutch, and a spring controlled pedal having a connection to said switch slide to manipulate the said slide and adjust the position thereof to actuate the said electromagnet to control the said brake and the position thereof.

25. In a mechanism of the character described, the combination of an electric motor, gear actuating means and connections from said motor to a brake rigging, a disk clutch in said gear connections, spring means for holding the clutch engaged, an electromagnet connected to release the said clutch, a battery or source of electric current, a switch means carried by the said brake actuating means having connections from the battery and with connections to the said electromagnet, a yielding switch member in normally open position to contact and deliver current to the said electromagnet, a switch slide having a shoulder to cooperate with the said switch member to close the circuit on the adjustment of the switch slide for the actuation of the switch to close the circuit to the electromagnet to throw out the clutch, and a pedal having a connection to said switch slide to manipulate the said slide and adjust the position thereof to actuate the said electromagnet to control the said brake and the position thereof.

26. In a mechanism of the character described, the combination of an electric motor, gear actuating means and connections from said motor to a brake rigging, a battery or source of electric current, a switch means carried by the said brake actuating means having connections from the battery and with a connection to the motor, a yielding switch member in normally open position to contact and deliver current to the said motor, a switch slide having a shoulder to cooperate with the said switch member to close the circuit on the adjustment of the switch slide in the direction of movement for the application of the brakes, and a pedal having a connection to said switch slide to manipulate the said slide and adjust the position thereof to actuate the said motor to control the said brake and the position thereof.

27. In a mechanism of the character described, the combination of an electric motor, gear actuating means and connections from said motor to a brake rigging, a releasable clutch in said gear connections, an electromagnet connected to release the said clutch, a battery or source of electric current, a switch means carried by the said brake actuating means having connections from the battery and with a connection to said electromagnet, a yielding switch member in normally open position to contact and deliver current to the said electromagnet, a switch slide having a shoulder to cooperate with the said switch member to close the circuit on the adjustment of the switch slide for the actuation of the switch to close the circuit to the electromagnet to throw out the clutch, and a pedal having a connection to said switch slide to manipulate the said slide and adjust the position thereof to actuate the said electromagnet to control the said brake and the position thereof.

28. An electric brake for vehicles, including an electric motor having connections and a movable part to apply the brake, a clutch in said connections, an electromagnet to control said clutch, a source of electric current having circuits to said motor and said electromagnet, a double switch means, actuator means for the said switch, cooperating stops between the said switch actuator means and the movable part of the brake mechanism to close the circuit to control the motor to apply the brake when the switch actuator means is moved in the direction of the brake, and cooperating stops between the said switch actuator means and the movable part of the brake mechanism to close the circuit on the reverse movement to operate the electromagnet to release the brake.

29. An electric brake for vehicles, including an electric motor having connections and a movable part to apply the brake, a clutch in said connections, an electromagnet to control said clutch, a source of electric current having a circuit to said electromagnet, a switch means, actuator means for the said switch, and cooperating stops between the said switch actuator means and the movable part of the brake mechanism to close the circuit to operate the electromagnet to release the brake.

30. In an electric structure, the combination of an electric motor, a movable member actuated thereby, a clutch to throw the same into and out of gear, an electromagnet to control said clutch, a source of electric current having circuits to said motor and said electromagnet, a double switch, actuator means for said switch, cooperating stops between the said switch actuator means and said movable member to close the circuit to control the motor and regulate the movement of the movable member, and cooperating stops between said switch actuator means and the movable part to close the circuits to operate the electromagnet to release the clutch.

31. In an electric structure, the combination of an electric motor, a movable member actuated thereby, a clutch to throw the same into and out of gear, an electromagnet to control said clutch, a source of electric current having a circuit to said electromagnet, a switch, actuator means for said switch, and cooperating stops between said switch actuator means and the movable part to close the circuits to operate the electromagnet to release the clutch.

ROYAL E. ADAMS.